US011919756B2

(12) United States Patent
Masters et al.

(10) Patent No.: US 11,919,756 B2
(45) Date of Patent: Mar. 5, 2024

(54) AERIAL WORK VEHICLE BOOM AUXILIARY CONTROL PANEL

(71) Applicant: Xtreme Manufacturing, LLC, Henderson, NV (US)

(72) Inventors: James Charles Masters, Henderson, NV (US); Andrew Jared Farnsworth, Henderson, NV (US)

(73) Assignee: XTREME MANUFACTURING, LLC, Henderson, NV (US)

( * ) Notice: Subject to any disclaimer, the term of this patent is extended or adjusted under 35 U.S.C. 154(b) by 283 days.

(21) Appl. No.: 16/781,298

(22) Filed: Feb. 4, 2020

(65) Prior Publication Data

US 2021/0238020 A1 Aug. 5, 2021

(51) Int. Cl.
*B66F 11/04* (2006.01)
*B66F 13/00* (2006.01)
*B66F 17/00* (2006.01)

(52) U.S. Cl.
CPC ............ *B66F 11/046* (2013.01); *B66F 13/00* (2013.01); *B66F 17/006* (2013.01)

(58) Field of Classification Search
CPC ....... B66F 11/04; B66F 11/042; B66F 11/044; B66F 11/046; B66F 13/00; B66F 17/00; B66F 17/006
See application file for complete search history.

(56) References Cited

U.S. PATENT DOCUMENTS 2,986,295 A 5/1961 Shaffer
3,056,867 A 10/1962 Eitel
3,631,939 A * 1/1972 Johnson ................ B66F 11/046 182/2.4
3,642,096 A * 2/1972 Valentine ............. B66F 11/044 182/2.11
3,741,337 A * 6/1973 Visinsky ............... B66F 11/044 182/148
3,757,895 A * 9/1973 Knutson ............... B66F 11/044 182/2.4
3,774,217 A * 11/1973 Bonner ................. B66F 11/046 182/148
3,963,095 A * 6/1976 Hedges ..................... E06C 5/06 182/2.5

(Continued)

FOREIGN PATENT DOCUMENTS

CA 2030202 C 10/1995
CN 209602039 U 11/2019

(Continued)

OTHER PUBLICATIONS

BIL-JAX, 4527A Hydraulic Articulating Boom Lift Operator's Manual, 2006, B33-01-0095.

(Continued)

*Primary Examiner* — Daniel P Cahn
*Assistant Examiner* — Shiref M Mekhaeil
(74) *Attorney, Agent, or Firm* — Armstrong Teasdale LLP

(57) ABSTRACT

An aerial work vehicle includes a boom and a work platform coupled to a distal end of the boom. The work platform has a forward end in a direction of travel and an aft end opposite the forward end. The aerial work vehicle also includes a first control panel coupled to the forward end of the work platform and a second control panel coupled to the aft end of the work platform.

13 Claims, 6 Drawing Sheets

(56) References Cited

U.S. PATENT DOCUMENTS

| | | | | |
|---|---|---|---|---|
| 4,049,079 | A * | 9/1977 | Stedman | B66F 11/044 182/2.5 |
| 4,089,388 | A * | 5/1978 | Johnson | B66F 11/044 182/2.8 |
| 4,160,492 | A * | 7/1979 | Johnston | B66F 11/046 182/2.11 |
| 4,287,966 | A * | 9/1981 | Frees | B66F 9/06 187/234 |
| 4,331,215 | A * | 5/1982 | Grove | B66F 11/046 182/2.1 |
| 4,334,594 | A * | 6/1982 | Jost | B66F 11/044 182/2.1 |
| 4,676,339 | A * | 6/1987 | Rybka | B66C 19/002 182/2.11 |
| 4,721,213 | A * | 1/1988 | Eitel | B66F 11/044 182/2.11 |
| 4,755,100 | A * | 7/1988 | Schultz | B66F 9/122 60/551 |
| 5,196,998 | A * | 3/1993 | Fulton | G05B 19/427 182/148 |
| 5,286,159 | A | 2/1994 | Honma | |
| 6,405,114 | B1 * | 6/2002 | Priestley | B66F 11/046 701/50 |
| 6,810,993 | B2 | 11/2004 | Promersberger | |
| 8,490,746 | B2 * | 7/2013 | Cummings | B66F 17/006 182/2.1 |
| 8,944,217 | B2 | 2/2015 | Anasis et al. | |
| 9,079,756 | B2 | 7/2015 | Beji | |
| 9,382,099 | B2 * | 7/2016 | Aquino | B66B 9/16 |
| 9,550,475 | B1 | 1/2017 | Walker et al. | |
| 9,567,193 | B2 * | 2/2017 | Schmid | B66C 13/40 |
| 9,663,333 | B2 | 5/2017 | Sennebogen | |
| 10,611,347 | B1 * | 4/2020 | Archer | B66F 11/046 |
| 10,919,748 | B2 * | 2/2021 | Calomino | B66F 9/12 |
| 11,117,790 | B2 * | 9/2021 | Keller | B66F 9/195 |
| 11,130,663 | B2 * | 9/2021 | Linsmeier | E06C 7/16 |
| 2002/0175319 | A1 * | 11/2002 | Green | B66F 7/04 701/1 |
| 2004/0085184 | A1 * | 5/2004 | Sigmund | B66F 17/006 340/3.42 |
| 2004/0174030 | A1 * | 9/2004 | Sentenne | B66F 11/042 296/24.3 |
| 2006/0101782 | A1 | 5/2006 | Sanders | |
| 2007/0104563 | A1 * | 5/2007 | Hamm | B66F 9/06 414/572 |
| 2009/0008175 | A1 * | 1/2009 | Donaldson | B66F 11/044 180/209 |
| 2009/0071751 | A1 | 3/2009 | Schmidt et al. | |
| 2009/0145871 | A1 * | 6/2009 | Bond | B66F 11/046 212/285 |
| 2012/0091227 | A1 | 4/2012 | Bisson et al. | |
| 2012/0217091 | A1 | 8/2012 | Baillargeon et al. | |
| 2013/0338815 | A1 | 12/2013 | Ogawa et al. | |
| 2015/0027808 | A1 | 1/2015 | Baillargeon et al. | |
| 2015/0225216 | A1 * | 8/2015 | Koyama | B66F 9/072 187/244 |
| 2016/0099122 | A1 * | 4/2016 | Cummings | B66F 17/006 200/5 R |
| 2017/0211765 | A1 * | 7/2017 | Walker | B66F 11/04 |
| 2017/0267508 | A1 * | 9/2017 | Huber | G05B 9/02 |
| 2017/0291801 | A1 * | 10/2017 | Mellott | E02F 9/2271 |
| 2017/0291802 | A1 * | 10/2017 | Hao | B66F 9/00 |
| 2018/0050893 | A1 * | 2/2018 | Jeffries | B66F 11/044 |
| 2018/0057333 | A1 * | 3/2018 | Gale | B66F 11/04 |
| 2018/0195589 | A1 * | 7/2018 | Mark | B66F 17/006 |
| 2019/0210854 | A1 * | 7/2019 | Eck | B66F 17/006 |
| 2019/0225471 | A1 * | 7/2019 | Luminet | B66F 11/042 |
| 2019/0233270 | A1 * | 8/2019 | Dittus | B66F 17/006 |
| 2019/0242094 | A1 * | 8/2019 | Bolz | E02F 9/2004 |
| 2019/0300346 | A1 | 10/2019 | Iotti | |
| 2019/0300349 | A1 | 10/2019 | Iotti | |
| 2020/0039802 | A1 * | 2/2020 | Keller | B66F 9/14 |
| 2020/0317489 | A1 * | 10/2020 | Bhatia | B66F 11/042 |
| 2021/0078844 | A1 * | 3/2021 | Hubert | B66F 11/044 |
| 2021/0154833 | A1 | 5/2021 | Peters et al. | |
| 2021/0276848 | A1 | 9/2021 | Miller et al. | |
| 2021/0285467 | A1 * | 9/2021 | Wenker | B66F 11/044 |
| 2022/0227611 | A1 | 7/2022 | Cadou et al. | |

FOREIGN PATENT DOCUMENTS

| | | | |
|---|---|---|---|
| EP | 1026120 | A2 | 8/2000 |
| EP | 2985256 | A1 | 2/2016 |
| EP | 3392192 | A1 | 10/2018 |
| EP | 3418249 | A1 | 12/2018 |
| FR | 3045589 | A1 | 6/2017 |
| JP | 2017095093 | A | 6/2017 |
| JP | 6189512 | B1 | 8/2017 |
| KR | 20180034866 | A | 4/2018 |
| WO | 199800618 | A1 | 6/1997 |
| WO | 2012091227 | A1 | 7/2012 |
| WO | 2017140917 | A1 | 8/2017 |

OTHER PUBLICATIONS

Extended European Search Report, dated Jun. 15, 2021, for related EP patent application No. EP 20214057.0 (8 pgs).

Extended European Search Report issued in related Application No. 22163014.8, dated Sep. 6, 2022 (9 pages).

Extended European Search Report issued for Application No. EP 20214029.9, dated Jun. 18, 2021 (8 pgs).

Product information—"Skyman series", Dec. 22, 2018, Retrieved from the Internet: URL: https://web.archive.org/web/20181222191436/http://www.dasancrane.com/contents/prod020201.php.

* cited by examiner

AERIAL WORK VEHICLE BOOM AUXILIARY CONTROL PANEL

FIELD

The field of the disclosure relates generally to construction equipment, and more particularly self-propelled construction equipment including a boom and work platform positioned at a distal end of the boom.

BACKGROUND

At least some known construction machines include a traveling table that includes a propulsion system configured to drive at least one wheel of the traveling table and a steerage system. The propulsion system and steerage system may be controlled from a first control console positioned on a work platform near the end of a boom coupled between the traveling bas and the work platform. Propulsion system and steerage system input devices located on the first control console permits operation of the propulsion system and steerage system from the first control console. The control console also includes input devices for controlling the boom. The boom is used to position work materials or a work platform close to a site of delivery of the work materials or a position for users to access a work site.

Typically, when operating the traveling table to get to a work site, an operator faces a first direction. The first control panel is oriented for operation with the operator facing in the first direction. However, when operating the boom, the operator faces the opposite direction to be able to observe the position of the boom or signals from a signaler during boom operations. During such times, the boom controls seem to the operator, to operate oppositely. For example, moving a joystick to the right moves the boom to the right when the operator is facing in the first direction. However, the boom operates backwards relative to the operator when faced in the second direction.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION

In one aspect, an aerial work vehicle includes a boom and a work platform coupled to a distal end of the boom. The work platform has a forward end in a direction of travel and an aft end opposite the forward end. The aerial work vehicle also includes a first control panel coupled to the forward end of the work platform and a second control panel coupled to the aft end of the work platform.

In another aspect, an aerial work vehicle includes a table having a forward end, an aft end opposite the forward end, a chassis extending therebetween, and at least one powered drive wheel or track assembly. The aerial work vehicle further includes a platform, a boom having at least one boom section connecting the platform and the table, and a first control panel on the table including a first plurality of manual input devices responsive to an operator for receiving boom motion commands for causing the boom to move in a desired direction and motion commands for causing the table to move in a desired direction. The aerial work vehicle also includes a second control panel on the platform including a second plurality of manual input devices responsive to an operator for receiving boom motion commands for causing the boom to move in a desired direction and motion commands for causing the table to move in a desired direction. The aerial work vehicle further includes a third control panel on the platform including a third plurality of manual input devices responsive to an operator for providing boom motion commands for causing the boom to move in a desired direction. The aerial work vehicle also includes a lockout circuit interconnecting the first control panel, the second control panel, and the third control panel to prevent motion commands received by the first control panel and the second control panel from causing the table to move when the third control panel is active.

In yet another aspect, a method of forming a construction machine that has a personnel platform coupled to a distal end of a boom includes orienting a first control panel in a first direction of travel of the construction machine, the first control panel configured to control propulsion and steering of the construction machine over a surface and providing a lockout circuit that prevents operation of propulsion and steering of the construction machine. The method further includes orienting a second control panel configured to control operation of the boom, in a second direction of work of the personnel platform, the second direction of work being different than the first direction of travel.

DETAILED DESCRIPTION

A machinery control system that includes an ergonomically correctly oriented boom control panel is described herein. Construction machinery, boats, and other vehicles may have more than one mode of operation including a self-propulsive mode of operation. Other modes of operation may be used when the self-propulsive mode is secured at a work site. The different modes of operation may also be associated with different directions of primary attention. In other words, during the self-propulsive mode of operation, the primary focus of the operator's attention is toward a forward end of the vehicle in the direction of travel. However, after arriving at a site of work activities, secured from the self-propulsive mode of operation and in another mode, for example, a boom operations mode, the primary focus of the operator's attention shifts to, in this example, the boom. Operating the boom with controls that are oriented for the operator facing in the direction of travel or the first direction is at best an inconvenience. The operator must remember that the controls are oriented for the operator to be facing in a direction opposite to the direction of his current primary focus, the boom. This requires the operator to make regular mental corrections for giving commands to the boom. For example, if the operator wants the boom to move to his current left when facing the boom, he must give a right direction input because the control console is oriented for forward facing operation and the boom is toward an aft end of the vehicle.

To alleviate this reverse orientation problem, the machinery control system incorporates a third control panel, which typically only has boom controls, is oriented in the correct direction of operation in a mode other than the self-propulsive mode of operation, and when activated, locks out the controls for the self-propulsive mode of operation.

Figure 1:
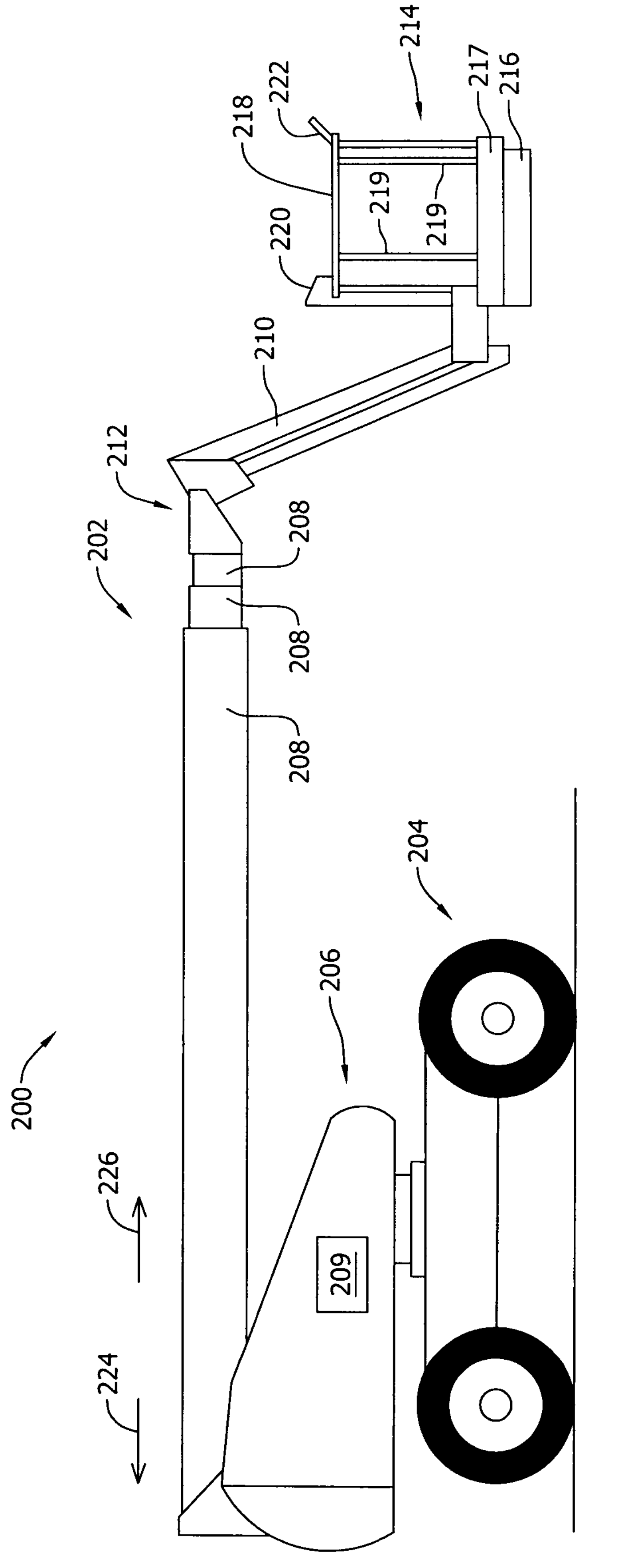
FIG. 1 is a side elevation view of a type of construction machine, such as, an aerial work platform with a boom retracted.
Figure 2:
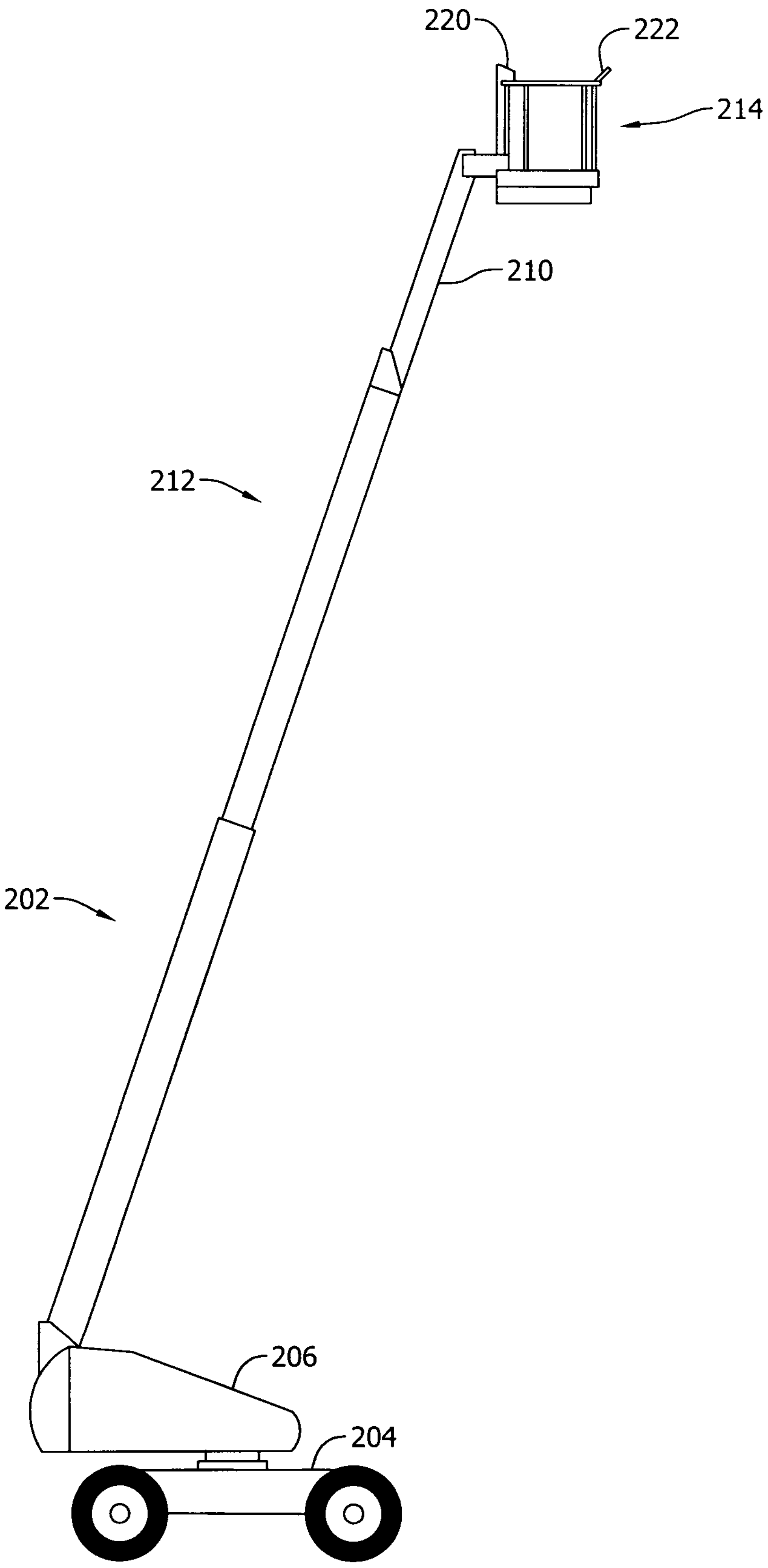
FIG. 2 is a side elevation view of the construction machine with the boom extended.

FIG. 1 is a side elevation view of a construction machine 200 of the aerial work platform type with a boom 202 retracted. FIG. 2 is a side elevation view of construction machine 200 with boom 202 extended. In the example embodiment, construction machine 200 includes a chassis 204, a rotary table 206 and boom 202. Boom 202 is formed of one or more sections 208 that can be telescoped out to extend a height of boom 202. A high pressure fluid system 209 provides a motive force for operating boom 202. In various embodiments, high pressure fluid system 209 uses hydraulic oil fluid, however, other fluids may be used. A jib 210 coupled to a distal end 212 of one or more sections 208 facilitates leveling a work platform 214. Jib 210 also permits boom 202 to reach over, for example, obstacles, such as, walls and heating and ventilating equipment on a roof.

Work platform 214 includes a walking deck 216 for supporting a user and a kick plate 217. A handrail 218 provides fall protection for the user, and one or more stanchions 219 are provided that are usable for mounting equipment, such as, a first control panel 220 and a second control panel 222. First control panel 220 is oriented for observing indicia and operating control features on first control panel 220 by a user facing in a forward direction 224, which is typically the direction of travel around a jobsite. Second control panel 222 is oriented for observing indicia and operating control features by a user facing in a rearward direction 226 or in a direction other than the direction of travel.

Figure 3:
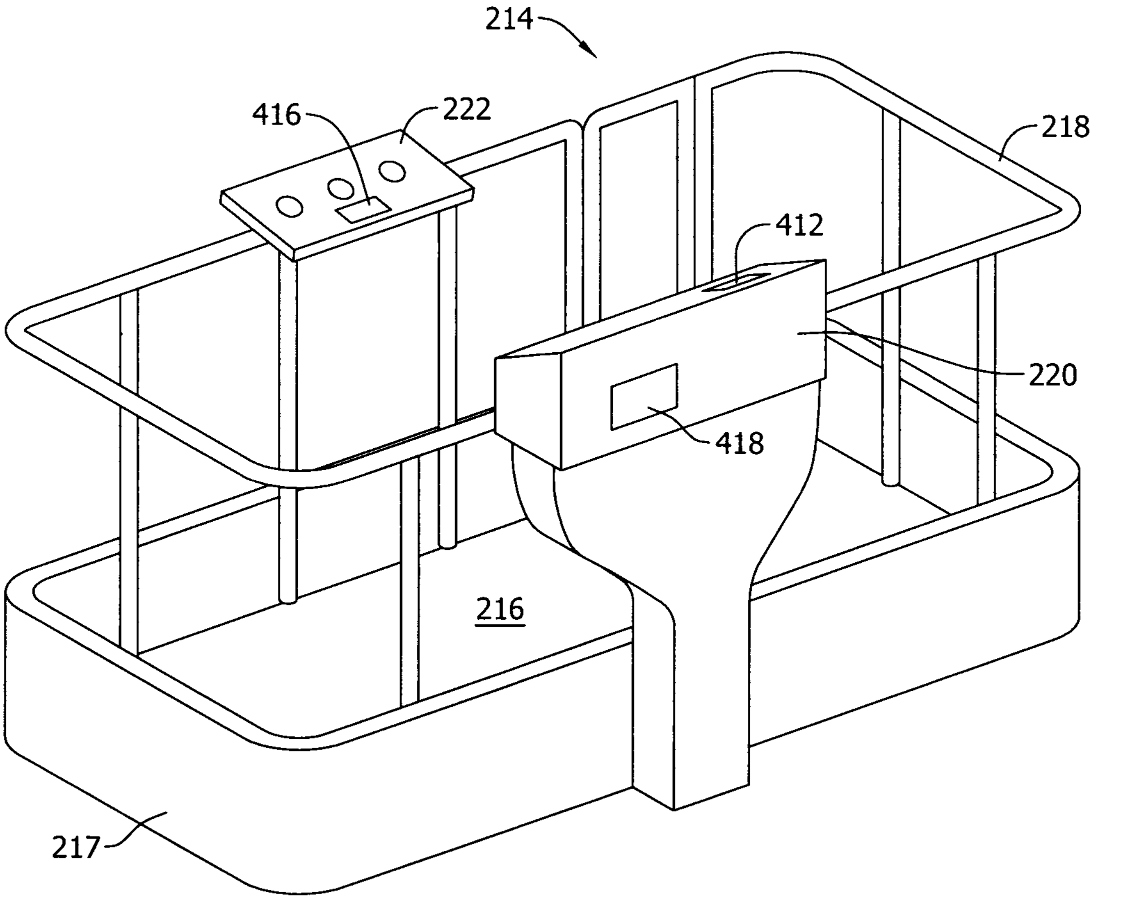
FIG. 3 is a perspective view of a work platform that may be used with the construction machine shown in FIGS. 1 and 2.

FIG. 3 is a perspective view of work platform 214 that may be used with construction machine 200. In the example embodiment, work platform 214 includes walking deck 216 and kick plate 217, and a handrail 218. Work platform 214 includes second control panel 222 including a second plurality of manual input devices 412 responsive to an operator for receiving manual boom motion commands for causing boom 202 to move in a desired direction and motion commands for causing chassis 204 to move in a desired direction. A second control panel 222 on work platform 214 includes a second plurality of manual input devices 416 responsive to an operator for providing boom motion commands for causing boom 202 to move in a desired direction. Work platform 214 also include a lockout circuit 418 interconnecting first control panel 220 and second control panel 222 to prevent motion commands received by first control panel 220 and second control panel 222 from causing chassis 204 to move when second control panel 222 is active.

Figure 4:
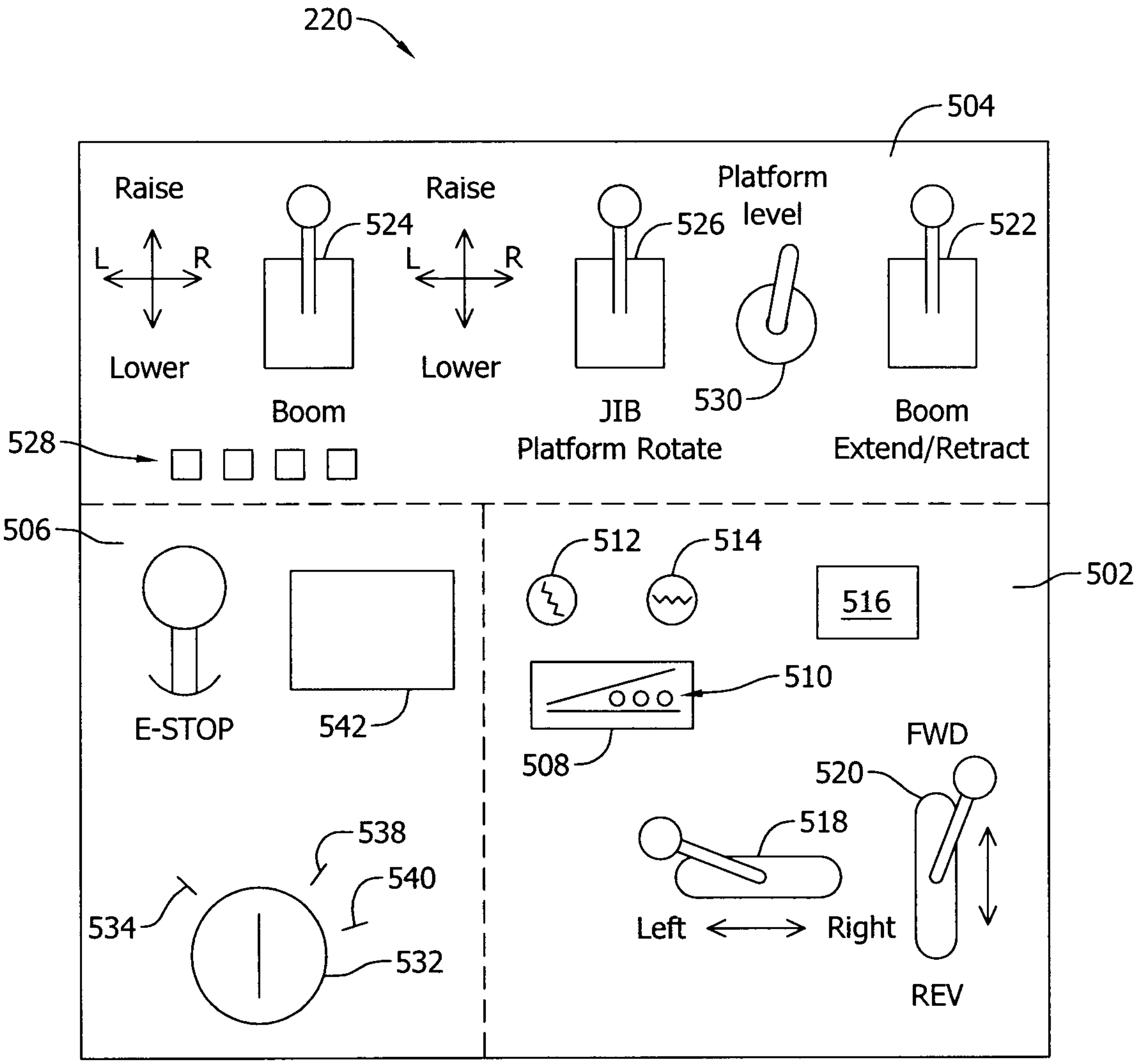
FIG. 4 is a plan view of a control panel, which may be used in the position of a first control panel.

FIG. 4 is a plan view of first control panel 220. In the example embodiment, first control panel 220 includes a self-propulsion section 502, a boom section 504, and a lockout section 506.

Self-propulsion section 502 includes, for example, a battery condition indicator 508 having indicator LEDs 510 that light up to indicate the level of charge remaining in the batteries. For example, a lighted green LED indicates an adequate charge level. A lighted yellow LED indicates the need for charging soon. A lighted red LED warns that the battery charge level is low, boom operations should be halted until the batteries are recharged. Self-propulsion section 502 may also include an engine START switch or button 512 and, if necessary, a CHOKE control 514. A cold engine may be started by pressing Engine START button 512 while pressing and holding CHOKE control 514. To start/restart a warm engine, press START button 512 only. A display panel 516 is a lighted text window that displays the present operating status or an existing error condition. Display panel 516 may also include a plurality of soft keys or associated hard keys from which to accept input data. A steerage control 518 and propulsive speed control 520 are used to move construction machine 200 from one job site location to another. Steerage control 518 may be embodied in a joystick, as shown, or in a steering wheel, a trackball, or the like. Propulsive speed control 520 may be embodied as a joystick, as shown, or in a foot pedal or other control device.

Boom section 504 includes a boom extend/retract control 522, which is used to extend or retract the telescopic feature of boom 202. Boom motion continues until boom 202 extend/retract control 522 is released or until boom 202 reaches a hard stop or a safe travel limit. Operating a boom control 524 LOWER BOOM RAISE or the UPPER BOOM RAISE button or toggle will raise the selected boom segment. Pressing the LOWER BOOM DOWN or UPPER BOOM DOWN button will lower the selected boom segment. Boom 202 motion continues until boom control 524 is released or until each boom section 208 reaches a hard stop or a safe travel limit. Operating a JIB control 526 RAISE will raise a jib boom, if installed. Operating a JIB control 526 LOWER will lower the jib boom. Jib boom motion continues until the control is released or until the jib boom reaches a hard stop or a safe travel limit. Operating a BOOM ROTATION control 524 in a CW (clockwise) or a CCW (counterclockwise) commands table 206 to rotate in the direction selected until boom control 524 is released or a travel stop is reached. Boom 202 is capable of rotating through, for example, seven hundred degrees.

A plurality of SPEED buttons 528 may be available along the lower area of boom section 504. If available, one of plurality of SPEED buttons 528 may be selected prior to or simultaneous with selecting a boom function to command the speed at which the boom function should be carried out. In the example embodiment, four speeds are available to control the positioning of the boom lift.

A platform level switch 530 is actuated to level work platform 214. In one embodiment, platform level switch 530 levels work platform 214 only. In another embodiment, platform level switch 530 levels work platform 214 and, if necessary, controls for boom 202 and jib 210.

Lockout section 506 includes a key switch 532 used to select the active control panel for operating construction machine 200. Turning key switch 532 to a PLATFORM position 534 selects operation from first control panel 220. Turning key switch 532 to a PLATFORM (BOOM) position 538 selects operation from second control panel 222. A power off position 540 interrupts all electric and fluid power operations except emergency lowering. Removing the key protects against operation by unauthorized persons. The key may be removed with key switch 532 in any selected position.

Automatic outrigger extension/retraction may be accomplished using, for example, an outrigger control 542. In an embodiment, outrigger control 542 and a level control 544 may be activated simultaneously or sequentially to automatically deploy outriggers when needed. The outriggers may also be manually extended or retracted. An outrigger indicator notifies the operator when the outriggers are properly deployed and the weight of construction machine 200 is on the outriggers. Each of the outer outrigger indicators indicates load is on the outrigger footpad. Each of the inner outrigger indicators, when flashing, indicates that side is low and needs to be further raised for leveling.

Figure 5:
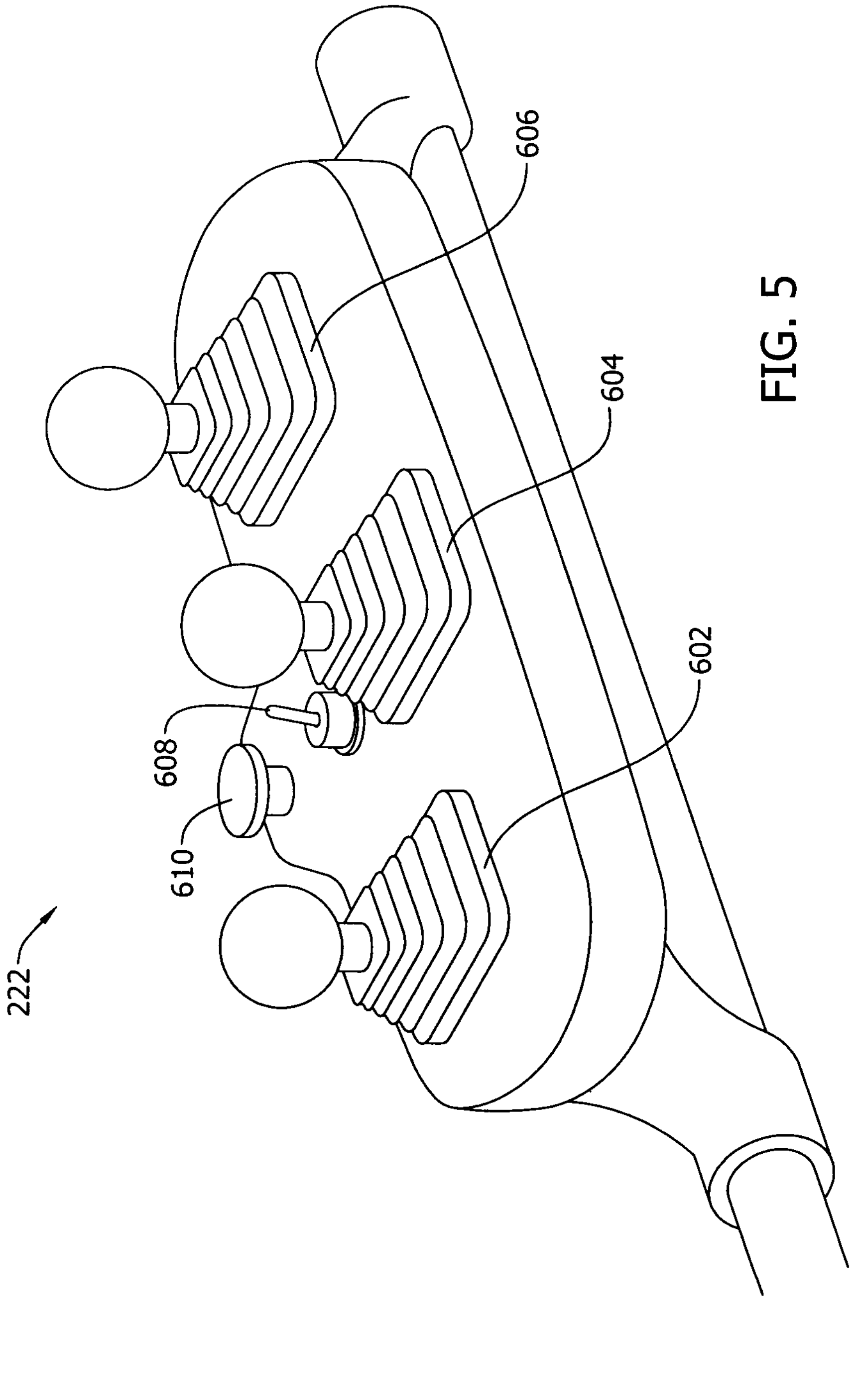
FIG. 5 is a perspective view of an auxiliary control panel.

FIG. 5 is a perspective view of second control panel 222. In the example embodiment, second control panel 222 includes a boom joystick control 602, a jib/platform rotate joystick control 604, a boom extension joystick control 606, a platform level toggle control 608, and an emergency stop (E-stop) pushbutton 610.

In the example embodiment, second control panel 222 is oriented on work platform 214 facing in a direction opposite to the direction first control panel 220 is facing. Such an orientation permits an operator to view directly where work platform 214 is at all times with respect to obstacles without having to look over his shoulder as would be the case if the boom controls were only located on first control panel 220. Placement of second control panel 222 on the platform along with first control panel 220 permits an immediate and seamless transition from a vehicle propulsive mode to a boom operation mode.

Figure 6:
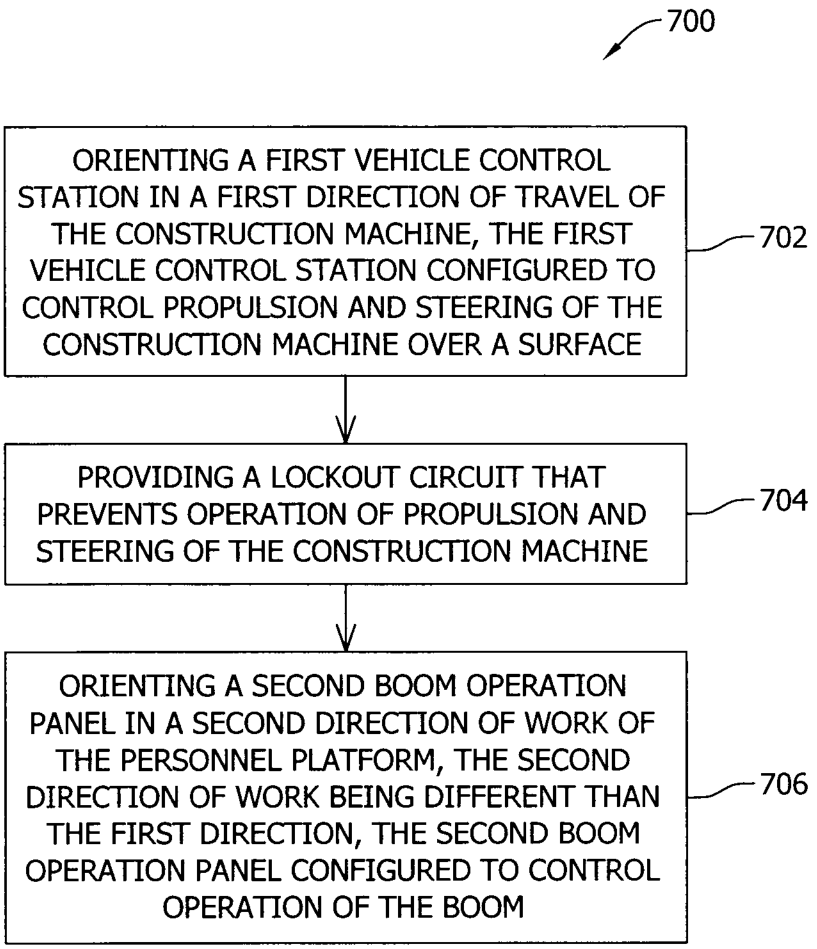
FIG. 6 is a flowchart of a method of forming a construction machine.

FIG. 6 is a flowchart of a method 700 of forming a construction machine. The construction machine includes a personnel platform coupled to a distal end of a boom. In the example embodiment, the method includes orienting 702 a first control panel in a first direction of travel of the construction machine. In other words, orienting the first control panel such that an operator facing the operator side of the first control panel is facing in the direction of travel, which is toward a forward end of the construction machine. The first control panel and the second control panel are oriented in opposite directions with respect to each other. Optionally, step 702 includes positioning the first control panel in the personnel platform mounted to at least one of a handrail and a stanchion. In various embodiments, the personnel platform includes a handrail surrounding a standing personnel platform deck. In other embodiments, the personnel platform includes a stanchion coupled to the deck standing upright. The stanchion may also be tilted, or canted and may be supported by the handrail, or only partially supported by the handrail. The first control panel is configured to control propulsion and steering of the construction machine over a surface.

Method 700 also includes providing 704 a lockout circuit that prevents operation of propulsion and steering of the construction machine during operation of the boom and may prevent operation of the boom during operation of the propulsion and steering of the construction machine. In some embodiments, operation of the propulsion and steering of the construction machine is permitted while the boom is being operated, for example, when operating the boom for personnel platform leveling, lowering the boom, or putting the boom in a condition better suited for the operating envelope being used. The lockout circuit provides an interlock that prevents operation of the boom during operation of propulsion and steering of the construction machine and prevents operation of propulsion and steering of the construction machine during operation of the boom.

Method 700 further includes orienting 706 a second control panel in a second direction of work of the personnel platform. The second direction being different than the first direction. The second control panel is configured to control operation of the boom. Optionally, step 706 includes positioning the first control panel and the second control panel in the personnel platform mounted to the handrail or a stanchion. In various embodiments, the personnel platform includes a handrail surrounding the standing personnel platform deck. In other embodiments, the personnel platform includes a stanchion coupled to the deck standing upright. The stanchion may also be tilted, or canted and may be supported by the handrail, or only partially supported by the handrail.

In the example embodiment, the first control panel and the second control panel are oriented face-to-face across a gap where an operator would stand while driving the construction machine or while operating the boom. Face-to-face refers to the position of the first control panel and the second control panel relative to each other.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aerial work vehicle comprising:

a boom;

a work platform for supporting an operator of the aerial work vehicle, said work platform coupled to a distal end of said boom, said work platform having a forward end in a direction of travel and an aft end opposite said forward end;

a first control panel coupled to the forward end of said work platform, said first control panel operable to raise and lower said boom and to rotate said boom when the operator is on said work platform and facing the forward end, said first control panel further operable to selectively propel said work vehicle while the operator is facing the direction of travel; and a second control panel removably coupled to the aft end of said work platform, said second control panel operable to raise and lower said boom and to rotate said boom when the operator is on said work platform and facing the aft end.

2. The aerial work vehicle of claim 1, further comprising a propulsion motor configured to drive at least one wheel or track assembly of said aerial work vehicle wherein said first control panel and said second control panel are interlocked to prevent operation of said aerial work vehicle from both said first control panel and said second control panel.

3. The aerial work vehicle of claim 1, further comprising a second control panel support, said second control panel is removably coupled to said second control panel support.

4. The aerial work vehicle of claim 1, further comprising a chassis, wherein said first control panel comprises a first plurality of manual input devices responsive to the operator for manual operation of said boom and said chassis, wherein said second control panel comprises a second plurality of manual input devices responsive to the operator for manual operation of said boom, and wherein manual input devices responsive to the operator for manual operation of said chassis are absent from said second plurality of manual input devices on said second control panel.

5. The aerial work vehicle of claim 1, wherein said first control panel is operable to level said work platform when the operator is on said work platform and facing the forward end.

6. The aerial work vehicle of claim 5, wherein said second control panel is operable to level said work platform when the operator is on said work platform and facing the aft end.

7. An aerial work vehicle comprising:

a table comprising a forward end and an aft end opposite said forward end;

a chassis;

at least one powered drive wheel or track assembly;

an operator platform sized to support an operator thereon;

a boom having at least one boom section connecting the platform and the table;

a first control panel on the platform comprising a first plurality of manual input devices responsive to the operator for receiving boom motion commands for raising and lowering the boom and causing the boom to move in a desired boom direction and motion commands for causing the table to move in a desired table direction, said first control panel further operable by the operator to selectively move the aerial work vehicle in a direction of travel while the operator is facing the direction of travel;

a second control panel on the platform comprising a second plurality of manual input devices responsive to the operator for receiving boom motion commands for raising and lowering the boom and causing the boom to move in the desired boom direction, said second control panel further operable by the operator while the operator is facing a direction opposite to the direction of travel; and a lockout circuit interconnecting the first control panel and the second control panel to prevent motion commands received by one of the first control panel and the second control panel from causing the boom to move when the other control panel is active.

8. The aerial work vehicle of claim 7, wherein said table further comprises a fluid system for moving the at least one boom section.

9. The aerial work vehicle of claim 7, wherein at least one of said first control panel and said second control panel comprise a control panel selector device configured to activate the other control panel.

10. The aerial work vehicle of claim 7, wherein manual input devices responsive to the operator for receiving motion commands for causing the table to move in the desired table direction are absent from said second plurality of manual input devices on said second control panel.

11. The aerial work vehicle of claim 7, wherein at least one of said first and said second control panels comprise a screen input device and wherein said pluralities of manual input devices comprise soft keys on the screen input device.

12. The aerial work vehicle of claim 7, wherein the operator platform has a first end and a second end opposite the first end, wherein the first control panel is coupled to the first end, the second control panel is removably coupled to the second end.

13. The aerial work vehicle of claim 12, wherein the first plurality of manual input devices are responsive to the operator for receiving boom motion commands when the operator is facing the first end, the second plurality of manual input devices are responsive to the operator for receiving boom motion commands when the operator is facing the second end.

* * * * *